(12) United States Patent
Zietlow et al.

(10) Patent No.: US 8,137,729 B2
(45) Date of Patent: *Mar. 20, 2012

(54) METHOD OF MAKING COMPLEXED FAT COMPOSITIONS

(75) Inventors: Philip K. Zietlow, Wayzata, MN (US); David W. Plank, Taylors Falls, MN (US)

(73) Assignee: General Mills, Inc., Minneapolis, MN (US)

( * ) Notice: Subject to any disclaimer, the term of this patent is extended or adjusted under 35 U.S.C. 154(b) by 374 days.

This patent is subject to a terminal disclaimer.

(21) Appl. No.: 12/095,196

(22) PCT Filed: Dec. 14, 2006

(86) PCT No.: PCT/US2006/062092
§ 371 (c)(1),
(2), (4) Date: Oct. 6, 2008

(87) PCT Pub. No.: WO2007/081637
PCT Pub. Date: Jul. 19, 2007

(65) Prior Publication Data
US 2009/0162507 A1    Jun. 25, 2009

(51) Int. Cl.
*A23D 9/007*    (2006.01)
(52) U.S. Cl. .......................................... 426/607; 426/98
(58) Field of Classification Search .................. 426/607, 426/98
See application file for complete search history.

(56) References Cited

U.S. PATENT DOCUMENTS

| | | | |
|---|---|---|---|
| RE21,406 E | 3/1940 | Vogt | |
| 3,286,992 A * | 11/1966 | Armeniades et al. ......... | 366/339 |
| 3,404,869 A * | 10/1968 | Harder ........................... | 366/338 |
| 3,664,638 A | 5/1972 | Grout et al. | |
| 3,669,681 A | 6/1972 | Shoaf et al. | |
| 3,704,006 A * | 11/1972 | Grout et al. ................... | 210/758 |
| 5,063,077 A | 11/1991 | Vollbrecht et al. | |
| 5,304,545 A * | 4/1994 | Mentink et al. ............... | 554/212 |
| 5,304,546 A * | 4/1994 | Comini et al. ................ | 552/545 |
| 5,342,633 A | 8/1994 | Cully et al. | |
| 5,498,437 A | 3/1996 | Kohlrausch et al. | |
| 6,638,557 B2 | 10/2003 | Qi et al. | |
| 7,105,195 B2 * | 9/2006 | Plank et al. ................... | 426/601 |
| 7,736,684 B2 * | 6/2010 | Plank et al. ................... | 426/607 |
| 2003/0044490 A1 * | 3/2003 | Qi et al. ......................... | 426/98 |
| 2003/0232068 A1 | 12/2003 | Lewandowski et al. | |
| 2004/0116382 A1 | 6/2004 | Plank | |
| 2004/0120984 A1 * | 6/2004 | Artiss et al. ................... | 424/439 |
| 2005/0019475 A1 | 1/2005 | Plank et al. | |
| 2005/0025875 A1 | 2/2005 | Plank | |
| 2006/0019021 A1 | 1/2006 | Plank | |

OTHER PUBLICATIONS

Perry, R. H. 1973. Chemical Engineers' Handbook, 5th edition. McGraw-Hill Book Company, New York, p. 19-22 & 19-24.*

* cited by examiner

*Primary Examiner* — Carolyn Paden
(74) *Attorney, Agent, or Firm* — John A. O'Toole; Dale Bjorkman; Mara DeBoe

(57) ABSTRACT

A process of preparing a complexed fat composition in a continuous process is provided. The process comprises mixing a cyclodextrin with a solvent in an in-line mixing system at a temperature of from about 180 to about 200° F. (82.2 to about 93.3° C.), thereby solubilizing the cyclodextrin; mixing fat and the solubilized cyclodextrin in a static mixer mixing system at a temperature of from about 80 to about 120° F. (26.7 to about 48.9° C.) to form a fat/cyclodextrin composition comprising a fat/cyclodextrin complex; and cooling the fat/cyclodextrin composition in an in-line mixing system. The described continuous process is a very efficient manner of complexing fat with cyclodextrin, and provides compositions that exhibit excellent uniformity and homogeneity.

15 Claims, 1 Drawing Sheet

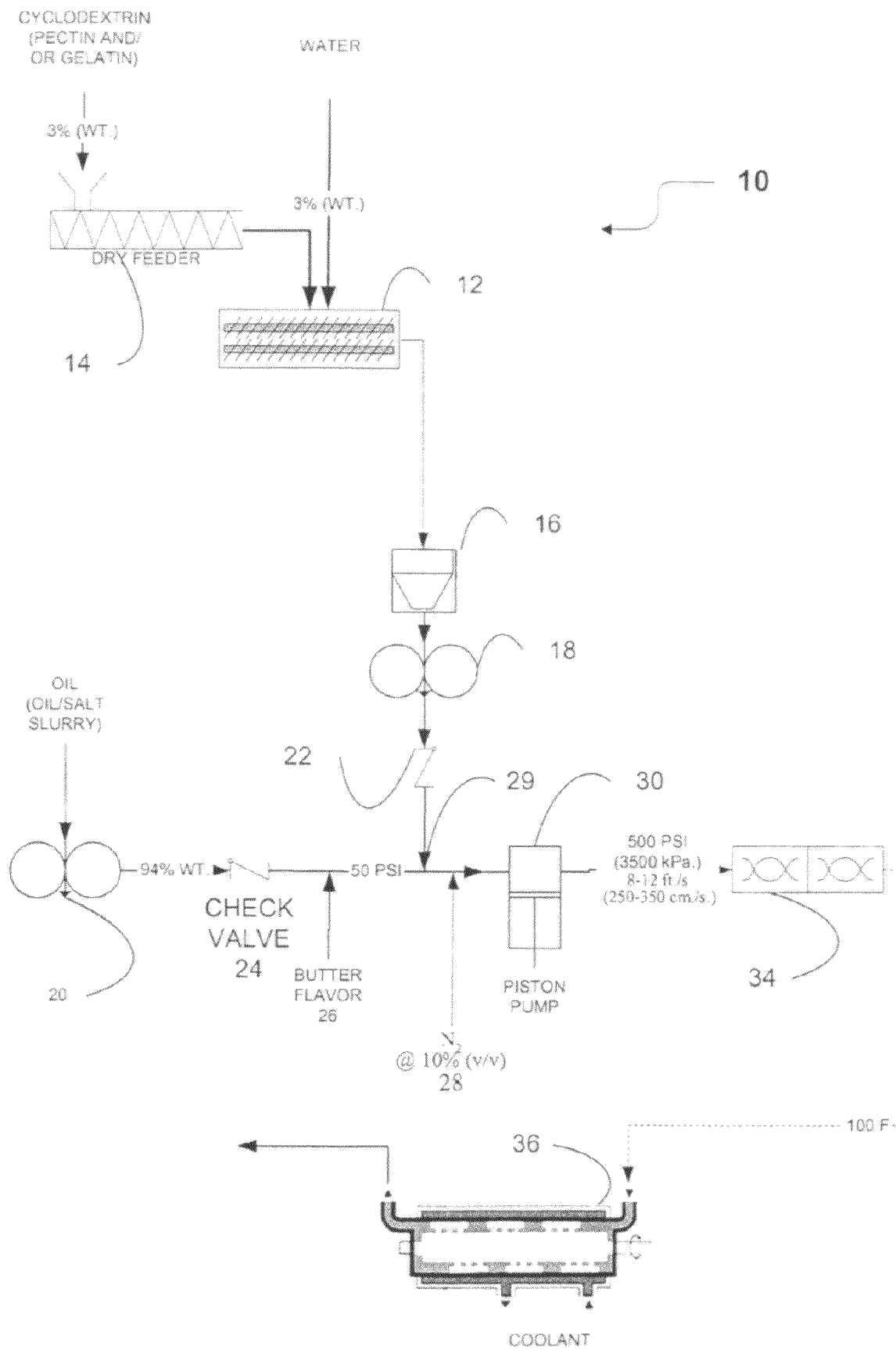

METHOD OF MAKING COMPLEXED FAT COMPOSITIONS

FIELD OF THE INVENTION

The invention relates to fat-containing compositions. More specifically, the invention relates to viscous fat-containing compositions having low amounts of trans-fat and to methods of binding cyclodextrin to fats.

BACKGROUND OF THE INVENTION

Recent studies have suggested that trans fatty acids in food products and food intermediates can be detrimental to the general health and well being of consumers in that it contributes to obesity and other health related issues.

Trans fatty acids are unsaturated fatty acids in which the hydrogens of a double bond (or unsaturation) are on opposite sides of the molecule. The trans isomer of the fatty acid causes the carbon chain to assume a straight-chain configuration similar to that of a saturated fat. Trans fatty acids are primarily formed through the metal-catalyzed process of hydrogenation, however they have also been found to form naturally at low levels in cow's milk. By hydrogenating oils through industrial processing, hydrogen atoms are added to unsaturated sites on fatty acids, creating a larger population of saturated fats in the oil. In a partially-hydrogenated oil, some of the unsaturated fatty acids remain. However, the processing causes some of the double-bonds of the unsaturated fatty acids to undergo isomerization to the trans configuration.

Partial hydrogenation of fats was introduced into the U.S. food supply beginning in 1910. The practice was put into widespread use in the 1940's in order to make semisolid fat products. The process of hydrogenation raises the melting point of a fat and increases the solid fat content. The stability of the fat is greatly enhanced through hydrogenation by reducing susceptibility to oxidation and subsequent rancidity. Therefore, positive contributions to shelf-life, texture and taste of food products are imparted by hydrogenated and partially hydrogenated fats.

Some scientific evidence shows that the trans fat that results from partial hydrogenation of oils raises the total cholesterol in humans to a greater extent than saturated fats. Trans fat is known to increase blood levels of low density lipoprotein (LDL), so-called "bad" cholesterol, while lowering levels of high density lipoprotein (HDL), known as "good" cholesterol.

Cyclodextrins have been used principally for the encapsulation of insoluble compounds on a molecular basis in order to enhance stability, reduce volatility and alter solubility as well as to increase shelf life of certain products. Such prior uses of cyclodextrins have been limited to flavor carriers and protection of sensitive substances against thermal decomposition, oxidation and degradation. In addition, more recently, cyclodextrins have also been used to remove fatty acids and cholesterol from animal fats and to remove cholesterol and cholesterol esters from egg yolks.

One potential solution to the high cholesterol problem teaches the treatment of the foodstuffs themselves with cyclodextrins rather than treatment of the consumer. U.S. Pat. Nos. 5,498,437; 5,342,633 and 5,063,077 discuss various processes for the removal of cholesterol and cholesterol esters from egg yolks, meat, animal fats, etc. It is thought that by reducing the level of cholesterol in such foodstuffs that overall levels of cholesterol can be reduced in consumers. However, processing steps to such foodstuffs increases the cost of delivering such products to market.

In some instances, a thickened fat is desired to provide dimensional stability (e.g., to minimize fluid flow or keep a fat ingredient in a particular location in a food article). At present, only three techniques for providing a thickened fat such as for use in a food product are practical. The first, hydrogenation, as described above, while useful and widely practiced undesirably results in the generation of trans fatty acids. The second technique involves addition of silicon dioxide to an oil. For example, U.S. Pat. No. 3,669,681 describes preparing a shortening for products which are heated prior to consumption, wherein edible oils are mixed with silicon dioxide and a bridging compound with the result being a shortening that is asserted to not weep or run at elevated temperatures while retaining desirable mouth feel characteristics of the untreated oil.

While useful, current food regulatory restrictions restrict employment of this technique. The third technique involves addition of sufficient amounts of hardstock, whether naturally occurring (such as palm oil hardstock) or synthetic (such as produced by hydrogenation), to an oil to provide desired amounts of thickening or hardening. Again, while useful, current consumer heath sensitivities favor minimization of consumption of such hardstock ingredients.

Fat compositions have been thickened by binding the fat with cyclodextrin by mixing the fat with a cyclodextrin that has been solubilized by a solvent, preferably water, in a batch process. This batch process is described in U.S. patent application Ser. No. 11/158,747; Titled: VISCOUS FAT COMPOSITIONS HAVING LOW AMOUNTS OF TRANS-FAT, METHODS AND PRODUCTS, filed Jun. 22, 2005.

SUMMARY OF THE INVENTION

The present invention provides a new continuous process for thickening or hardening fats and oils that is both useful and commercially practical (i.e., both economically and from a commercial production standpoint). The present new fat thickening technique is inexpensive, simple to commercially practice, and minimizes consumption of undesirable food ingredients such as trans fatty acids.

The present method provides a process of preparing a complexed fat composition in a continuous process comprising: the steps of:
  a) mixing a cyclodextrin with a solvent in an in-line mixing system at a temperature of from about 180 to about 200° F. (82.2 to about 93.3° C.), thereby solubilizing the cyclodextrin;
  b) mixing fat and the solubilized cyclodextrin in an in-line mixing system at a temperature of from about 80 to about 120° F. (26.7 to about 48.9° C.) to form a fat/cyclodextrin composition comprising a fat/cyclodextrin complex;
  c) cooling the fat/cyclodextrin composition in an in-line mixing system, in one embodiment to a temperature of from about 60 to about 80° F. (15.5 to about 26.7° C.).

It has surprisingly been found that by complexing fat with cyclodextrin in high binding ratios, a low trans fat content fat can be prepared having a high viscosity. The resulting complexed fat has a low amount of free cyclodextrin. Thus, embodiments of the invention can leave little or no residue on heating. Additionally, embodiments of the invention can absorb little or no flavors other than from the food. Additionally, embodiments of the resulting fat composition can exhibit enhanced resistance to oxidation of the fat, thereby prolonging useful storage life of the fat composition or food products containing the composition with diminished observance of rancidity of the fat. A fat-containing composition is provided comprising a fat component having less than 40% by weight of trans fat and a cyclodextrin, wherein at least about 25% of the cyclodextrin in the composition is complexed to the fat. In additional embodiments, the fat component has less than 20%, 10% or 2% of trans fat. Alternatively, the fat component can be substantially free of trans fat. In an embodiment of the present invention, the composition comprises less than about 50% saturated fat based on total fat content. In additional embodiments, the fat component has less than 25% or 15% of saturated fat based on total fat content. The fat compositions as provided herein can be substantially more viscous (when a liquid), or harder (when a solid) than a like fat composition that does not contain cyclodextrin that is complexed to the fat. This thickening and/or hardening of the fat can provide compositions that achieve desired physical properties even with little or no saturated fats. Thus, in one embodiment the present invention can provide food products having desired organoleptic properties while achieving at least a 25% reduction in fat as compared to an appropriate reference food as described in 21 CFR Sec 101.13(j)(1). Thickened fats are important for use in food products in that they provide the required consistency at the correct temperature to enable preparation of the food product. For example, a fat having the consistency of shortening is required to make laminated dough products and certain baked goods. Without the relatively hard consistency, the products would not have the texture that consumers have come to expect. Additionally, the perceived melting point of the fat contributes to the mouthfeel of the food product. The present invention advantageously provides the desired physical and general organoleptic properties of a thicker or harder fat without introduction of trans-fats, thereby providing substantial healthful benefits.

Alternatively, complexed fat/cyclodextrin compositions as provided herein can be blended with saturated fats to achieve desired organoleptic and performance properties with a substantial reduction in saturated fat content as compared to other food products that do not contain the complexed fat/cyclodextrin compositions.

In another aspect of the present invention, food products are provided comprising fat-containing compositions comprising a fat component having less than 0.5 g per serving of trans fat, and having a cyclodextrin, wherein at least about 25% of the cyclodextrin in the composition is complexed to the fat. Methods of using these food products comprising heating these food products by the non-manufacturing consumer are additionally provided. In such methods, the consumer can realize the benefit of having a convenient product having a fat composition with the desired viscosity and cooking behavior, while simultaneously having low levels of trans fat. In additional embodiments, the food product is substantially free of free cyclodextrin and/or is substantially free of saturated fat.

In a preferred embodiment of the present invention, at least about 25% of the cyclodextrin complexed with the fat of the complexed fat/cyclodextrin composition.

In another aspect of the present invention, it has surprisingly been found that very efficient binding of cyclodextrin to fat can be achieved by carrying out the complexation steps in a selected manner. The resulting fat/cyclodextrin complex provides a low trans fat content fat having a high viscosity. In an aspect of the present invention, the resulting complexed fat has a low amount of free cyclodextrin. A particular benefit of the present invention is that the fat provided herein does not rely on hydrogenation of fat to provide a thickened fat. In an aspect of the present invention, the fat as complexed as described herein has an Iodine Value that does not decrease more than 5% relative to the uncomplexed component fats.

Iodine Value may be determined by any appropriate technique, provided that the Iodine Value of both the complexed fat and uncomplexed component fats are determined by the same method so that the percent decrease can be appropriately determined. An exemplary methodology for measuring Iodine Value is AOCS Cd 1b-87.

Because of the use of components of a continuous process in the present invention, the resulting compositions are remarkably uniform and homogeneous in nature.

BRIEF DESCRIPTION OF THE DRAWINGS

FIG. 1 is a schematic process flow diagram of one preferred embodiment of the present method of preparation.

DETAILED DESCRIPTION

Turning now to the drawing, in which an embodiment of a system 10 for continuous preparation of a complexed fat is schematically presented, cyclodextrin and a solvent are mixed in an in-line mixing system, shown as a twin screw extruder 12 at a temperature of from about 180 to about 200° F. (82.2 to about 93.3° C.), thereby solubilizing the cyclodextrin in the solvent. An embodiment of the present invention uses a twin screw mixer having an SME of about 2 or less. Alternatively, this mixing step can be carried out in and desired conventional blender, mixer or a static mixing device, provided that a continuous supply of solubilized cyclodextrin can be provided for use in subsequent process steps.

The cyclodextrin in one embodiment of the present invention comprises alpha-cyclodextrin, beta-cyclodextrin, gamma-cyclodextrin, or mixtures thereof. Cyclodextrins comprise a doughnut shaped or cyclical structure composed of a number of alpha-D-glucose units (typically 6-8) having a hydrophilic exterior and a hydrophobic interior. Cyclodextrins are generally water soluble, although alpha-cyclodextrin is likely more water soluble than beta-cyclodextrin or gamma-cyclodextrin, and free flowing crystalline powders that are substantially if not completely odorless and white in color.

In one embodiment of the invention, at least a portion and preferably substantially all the cyclodextrin is alpha-cyclodextrin. Alpha-cyclodextrin is a cyclized ring of six alpha 1,4 linked glucose units. Alpha-cyclodextrin has a cavity dimension of about 0.50×0.79 (nm). The solubility of alpha-cyclodextrin in water is good and at 25° C. is about 14 (gm/100 mL). In contrast, the native solubility of cyclodextrins in fats is poor. A useful alpha-cyclodextrin is commercially available in the United States from Wacker Specialties, Adrian, Mich. 49221 and sold under the trademark CAVAMAX® W6 Wacker-Chemie, Burghausen, Germany. In another embodiment of the invention, alpha-cyclodextrin is used in combination or synergistically with beta-cyclodextrin and/or gamma-cyclodextrin, in particular ratios dependent upon the requirements of the ultimate user. In an exemplary embodiment, alpha-cyclodextrin can be used individually or can be combined with between 0-50% by weight beta-cyclodextrin or gamma-cyclodextrin or with between 0.1 to about 40% by weight beta-cyclodextrin. Beta-cyclodextrins and gamma-cyclodextrins are also available from Wacker Specialties, Adrian, Mich., USA, 49221.

One method of preparing cyclodextrins includes enzymatic treatment. Enzymatic degradation or treatment of the starch to produce cyclodextrins useful in the present invention is done through the use of cyclodextrin glucosyltransferase (CGTase, EC 2.4.1.19) or other enzymes, which results in a cyclic ring of sugar. In one method, cyclodextrins are produced by the action of cyclodextrin glucosyltransferase on hydrolyzed starch syrups at neutral pH (6.0-7.0) and moderate temperature (35-40° C.). Alternatively, cyclodextrins can be produced in planta by the expression of the gene encoding CGTase in the food plant of interest.

Generally, the cyclodextrin is added to solvent in an amount up to the solubility of the cyclodextrin in the solvent at the temperature of mixing. The solvent used for solvation of the cyclodextrin can be any solvent suitable for processing of the particular product to be prepared. For example the solvent desirably is safely consumable without adverse health concerns, or is readily removed from the product prior to consumption. Examples of particularly suitable solvents include water, alcohol, and mixtures of water and alcohol. Examples of alcohols particularly desired for use in the present invention include an edible alcohol such as non denatured ethanol or mixtures of water and ethanol. In additional embodiments, the water is at least deionized water and is preferably distilled water.

In this solubilization step, the cyclodextrin and solvent are preferably advantageously mixed at weight ratios from about 1:10 to about 10:1, or from about 5:1 to about 1:5, or from about 2:1 to about 1:2 of cyclodextrin to solvent. Advantageously, the resulting complexed fat product of the present invention is provided at a relatively low solvent (especially water) content, so that a majority of the solvent in the system is coordinated with the cyclodextrin. In other systems where the cyclodextrin is solubilized, the solvent is present in excess, and often desirably is removed when combined with a fat using a potentially expensive drying process, such as spray drying, paddle drying, drum drying, freeze drying, or evaporation of solvent by bulk heating. In an embodiment of the present system, no solvent (especially water) removal step is required to provide a low solvent or water content fat.

The cyclodextrin can be provided for mixing by, for example, use of a dry feeder 14. Optionally, additional ingredients, such as thickeners and texture enhancers may be incorporated with the cyclodextrin. Examples of such additional ingredients include gelatin and/or pectin. The use of such additional materials can result in advantageous cost savings as compared to a composition where the fat is mixed only with solubilized cyclodextrin.

The solubilized cyclodextrin after mixing in a preferred embodiment is in the form of a clear solution. By "clear" is meant that the solution is substantially free of any undissolved solids. This embodiment is preferred because a clear solution indicates that substantially all of the cyclodextrin is effectively solubilized.

The resulting solubilized cyclodextrin composition is optionally collected at hopper 16 and advanced by rotary pump 18 to subsequent processing steps.

Fat components for complexing with the cyclodextrin are provided and pumped for mixing by, for example rotary pump 20. Advantageously, the fat component can be provided at elevated temperature to assist in pumpability of the fat, such as at a temperature of from about 90-110° F. An embodiment of the present invention contemplates providing the fat at a pump rate of about 150 g/s.

The fat components can be selected from oils and shortenings. Examples of such oils can include oil ingredients from vegetable, dairy and marine sources including butter oil or butterfat, soybean oil, corn oil, rapeseed or canola oil, copra oil, cottonseed oil, fish oil, safflower oil, olive oil, sunflower oil, peanut oil, palm oil, palm kernel oil, coconut oil, rice bran oil and other plant derived oils such as vegetable or nut oils. Examples of shortenings include animal fats such as lards, butter and hydrogenated vegetable oils such as margarine. Mixtures of different fats are also contemplated.

In an embodiment of the invention, the fat comprises an oil selected from soybean oil, high-oleic sunflower oil, high-linoleic soybean oil, palm oil, palm kernel oil or coconut oil. Particularly advantageous oils include low linolenic, high stearic soybean oil; canola oil; high or mid oleic canola oil; high or mid oleic sunflower oil, rice bran oil; and hydrogenated rapeseed oil.

An alternative fat composition comprises fat having a viscosity greater than about 12,500 cP at room temperature (i.e. 25° C.) measured relative to part number 12500 cps available from Brookfield Engineering Laboratories, Inc., 11 Commerce Boulevard, Middleboro, Mass., USA, 02346. An embodiment of a fat has a Solid Fat Content of greater than 15 at 21.1° C. Examples of solid fat compositions include animal fats such as lard, butter, and hydrogenated vegetable oils such as margarine.

The fats can be emulsified or stabilized with mono- or diglycerides or other emulsifiers known in the art. Examples of emulsifiers include fully hydrogenated soybean oil mono-, di-, or tri-glyceride; mono-, di-, or tri-stearate, sodium stearyl-2-lactylate, and mixtures thereof.

Additionally, the fat/cyclodextrin composition can comprise adjuvants such as colorants, flavorants, texture modifiers, preservatives, stabilizers, and the like, designed to improve the taste, appearance and nutritional properties of the finished products. If present, each such adjuvant ingredient can in one embodiment of the invention be present in an amount ranging from about 0.01% to about 5% of the complexed fat product. In one embodiment, the adjuvant is provided in the fat prior to complexation with the cyclodextrin. This embodiment is advantageous because it provides for excellent mixing and distribution of the adjuvant throughout the complexed fat/cyclodextrin composition.

The flow of the solubilized cyclodextrin and the fat can be regulated by any appropriated mechanisms, such as check valves 22 and 24. Additional adjuvants can optionally be added downstream from pumps 18 and 20 but before static mixer 34. For example, butter flavor 26 is shown to be added to the fat component before mixing with the solubilized cyclodextrin. Additionally, nitrogen 28 is shown to be added to the mixture of the fat and the solubilized cyclodextrin upstream from static mixer 34. The addition of nitrogen is desirable to assist in homogenization of the fat with solubilized cyclodextrin, and additionally provides a final product with a creamy looking texture. The addition of nitrogen also tends to reduce the rate of rancidification of certain oils during storage in the final product.

The fat and the solubilized cyclodextrin are combined at junction 29 at a desired ratio. In one embodiment, the solubilized cyclodextrin is combined with the fat in an amount of from about 0.05% to about 15%, and in another embodiment in an amount of from about 1% to about 10% by weight of the fat component. In another embodiment, the fat component is selected such that it has a viscosity less than about 12,500 cP at room temperature (i.e. 25° C.) measured relative to part number 12500 cps available from Brookfield Engineering Laboratories, Inc., 11 Commerce Boulevard, Middleboro, Mass., USA, 02346, and the cyclodextrin is present and complexed with the fat in an amount sufficient to exhibit a viscosity of a composition consisting of the fat component and the cyclodextrin that is greater than 2 times the viscosity of the fat component without the cyclodextrin.

The fat and the solubilized cyclodextrin are optionally advanced to the static mixer 34 by pump 30. An example of a pump suitable for such use is a piston pump. Additional adjuvants may optionally be added to the fat and the solubilized cyclodextrin downstream from this pump.

The thus combined fat and the solubilized cyclodextrin is mixed in static mixer 34. The fat is complexed in the liquid form, and therefore the step of mixing is carried out at a temperature in which the fat is in liquid form, and at a temperature of from about 80 to about 120° F. (26.7 to about 48.9° C.).

For purposes of the present invention, a static mixer or "motionless mixer" is a material pathway such as a tube provided with internal baffles or elements. As material is forced through the mixer, the material is divided and recombined to provide a uniform mixture. The mixer elements of the static mixer are typically oppositely oriented mixing blades provided in a configuration that promotes mixing of the material. An example of suitable mixer elements is a plurality of counter-rotated "bow-tie" or auger-like mixing blades of the type described in U.S. Pat. Nos. 3,286,992 and 3,664,638. Other configurations of mixing elements are commercially available and/or will now be appreciated by the skilled artisan in the mixing art. Such a static mixing element successively subdivides, rotates, and recombines the incoming material streams to convert them to a homogeneous composition. In typical operation of a static mixer, two or more material streams impinge upon the first mixing element of the static mixer, and the incoming streams are split or subdivided into a mass containing two, three, four or more streams of material, depending on the configuration of the element. This mixing process continues with each subsequent mixing element until the desired degree of mixing is achieved.

Specific examples of static mixers include, for example, a Kenics type mixer, a Sulzer mixer (SMX, SMXL or SMR) and static mixers of Toray, Erestat, Wymbs Eng. Ltd., Premixer Quarto, Premixer, Ross ISG, Komax, Lightnin, Prematechnik and Bran und Lubbe. Kenics type static mixers are described in U.S. Pat. No. 3,286,992, U.S. Pat. No. 3,664,638 and U.S. Pat. No. 3,704,006, the disclosures of which are incorporated herein by reference. Other mixers are described in U.S. Pat. No. 3,404,869, the disclosure of which is incorporated herein by reference.

A preferred static mixer design is the Koch SMX static mixer, where a mixing element is provided by welding intersecting bars or sheets together in an open lattice configuration. These elements in turn are welded to each other, with subsequent elements being rotated in position 90° from the one before it. A particularly preferred static mixer is an open lattice (i.e. SMX-type) static mixer comprising from about 3 to about 12 mixer elements, and more preferably from about 4 to 7 mixer elements.

Preferably, the static mixer has an inner diameter of from about 6 to about 14 mm diameter, and is configured to provide a flow rate of from about 250 to about 350 cm/s at a pressure of about 500 psi. The use of a combination of static mixers is also contemplated.

The mixing of fat and the solubilized cyclodextrin using a static mixer provides a high degree of homogeneity and excellent complexation of fat and solubilized cyclodextrin in a straightforward process. In a preferred embodiment of the present invention, the fat and the solubilized cyclodextrin are provided to the static mixer under high pressure (i.e. greater than about 250 psi, more preferably greater than about 350 psi, most preferably greater than about 450 psi) wherein the static mixer has a diameter of from about 6 to about 14 mm diameter. This combination of pressure and diameter produces high throughput (on the order of 250 to about 350 cm/s) and additionally high turbulent flow through the static mixer. The resultant combination not only imparts excellent homogeneity, but also promotes excellent complexation of the fat and the solubilized cyclodextrin in a very efficient manner.

After mixing in static mixer 34, the resulting fat/cyclodextrin mixture is cooled in an in-line cooling system 36 to a temperature of from about 60 to about 80° F. (15.5 to about 26.7° C.). A swept surface heat exchanger is preferred for use herein to practice the cooling step because of the capability of the swept surface heat exchanger to rapidly cool large amounts of fast-flowing material. Such a heat exchanger forms a thin film on the cooling surface of the heat exchanger. A suitable device for this step sometimes referred to in the art as a "Votator" is described in U.S. Reissue Pat. No. 21,406 to C. W. Vogt, Mar. 19, 1940. Such equipment is commercially available from several food processing manufacturers. A swept surface heat exchanger is particularly beneficial for use in the present process because the resulting complexed fat tends to cool to a plastic mass, rather than a hard solid mass, when cooled under agitation. The resulting complexed fat tends to be more deformable in the cooled state when the fat has been cooled using a non-quiescent cooling system.

Other cooling systems are also contemplated.

As noted above, the resulting complexed fat/cyclodextrin product is more uniform in product consistency than could be achieved by a batch process due to the consistency that can be obtained through the use in particular of the static mixer. The resulting complexed fat/cyclodextrin product is provided with beneficial viscosity and/or hardness properties as compared to a like fat that has not been complexed with cyclodextrin. In an embodiment of the present invention, the viscosity of a composition consisting of the fat component and the cyclodextrin is greater than 10 times, 20 times or 30 times the viscosity of the fat component without the cyclodextrin. In another embodiment of the invention, the viscosity of the fat/cyclodextrin composition is greater than about 12,500 cP at room temperature (i.e. 25° C.) measured relative to part number 12500 cps available from Brookfield Engineering Laboratories, Inc., 11 Commerce Boulevard, Middleboro, Mass., USA, 02346, and the cyclodextrin is present and complexed to the fat in an amount sufficient to exhibit a hardness of a composition consisting of the fat component and the cyclodextrin that is greater than 2 times the hardness of the fat component without the cyclodextrin. In additional such embodiments, the hardness of a composition consisting of the fat component and the cyclodextrin is greater than 10 times, 20 times or 30 times the hardness of the fat component without the cyclodextrin.

The present process additionally provides compositions wherein the cyclodextrin is present and complexed to the fat in an amount sufficient to provide a composition that has a Solid Fat Content at 21.1° C. that is at least about 1% higher than the Solid Fat Content at 21.1° C. of the fat component without the cyclodextrin. In additional such embodiments, the composition has a Solid Fat Content at 21.1° C. that is at least about 5%, about 8% higher or alternatively at least about 10% higher than the Solid Fat Content at 21.1° C. of the fat component without the cyclodextrin.

In an embodiment of the invention, at least about 50% of the cyclodextrin in the composition is complexed to the fat. In additional embodiments of the invention, least about 75% or 90% of the cyclodextrin in the composition is complexed to the fat.

The present complexed fat ingredients find particular suitability for use in connection with consumer food products. While particular attention is thus paid to such consumer food products in the present description, the skilled artisan will appreciate that the invention also can find suitability for use in connection with other product applications. For example, the present application can find usefulness in the provision of animal feed products especially for common companion animals such as dogs and domestic cats. The complexed fat ingredients can also find usefulness in the provision of, other non-food products, e.g., cosmetics (e.g., hand crèmes and lotions), soaps or shampoos or other viscous surfactant compositions that are based upon fatty triglycerides, e.g. paints using linseed oil as drying oil. In still other applications, the oils can be inedible such as those that are petroleum based. In an embodiment of the invention, the fat-containing composition is utilized in a food product. In an embodiment of the invention, the food product is provided as a packaged food product, either in bulk, in multiple servings (i.e. from about 2 to about 20 servings) or as single serving. The thus packaged food product can be provided in the cooked state, or the uncooked state. Examples of such food products include those that are packaged for heating by a non-manufacturing consumer. The physical and organoleptic properties of the fat-containing composition as described herein can provide particular benefit in such food products due to their shelf stability, excellent performance under a variety of environmental conditions. One particular example of a food product finding benefit of the present invention is related to products that are packaged for microwave heating.

Thus, the present invention provides a method of using the food product wherein the food product is packaged for subsequent heating of the food product by a non-manufacturing consumer. For purposes of the present invention, a "non-manufacturing consumer" is a party that does not assemble the raw ingredients of the food product, but instead can undertake one or more subsequent food preparation operations such as subdividing the food product into smaller portions and heating and optionally applying auxiliary ingredients such as sauces and the like to the food product. Examples of such non-manufacturing consumers include institutional food providers such as school cafeterias and hospitals and the like, and restaurants and the like. A sub-group of the non-manufacturing consumer is the retail customer, who is the individual party purchasing the food product for non-commercial use, such as feeding the family in the home. In an embodiment of the invention, the food product is provided as a packaged food product, either in bulk, in multiple servings (i.e. from about 2 to about 20 servings) or as single serving. In one embodiment, this packaging is for microwave heating of the food product by a non-manufacturing consumer. In a specific example of this embodiment, the food product is packaged in a package suitable for placement in a microwave oven. In a more specific example, the package is designed to assist in cooking of the food product in a microwave oven.

An example of a food product includes laminated dough products. Other examples of food products included biscuits, croissants, crescent rolls, cookies, cereals and cereal based products (particularly ready to eat ("R-T-E") cereals i.e. grain or vegetable based products in the form of flakes, extruded shapes or puffed, and optionally containing fruits and/or nuts or other such ingredients, such as corn flakes, puffed wheat, puffed rice, raisin bran flakes, and the like), cakes, snack bars, cereal bars, granola bars, bread products (such as loaf breads, rolls, and buns), and the like. Another example of a food product is a tablespread, such as butter or margarine, and in particular flavored spreads.

The complexed fat can be used as an ingredient or phase of a food product. For example, a fondant composition comprising the complexed fat and sugars (e.g., powdered sugar) can be used as a topical ingredient or a food phase (e.g., as a crème center to baked cookie wafers or other cookies or to a granola bar) or as a coating or icing for a variety of finished baked goods. The fondant can be the center of a filled candy or chocolate such as truffles. If desired, the fondant can also be aerated. In other food use applications, the complexed fat can be employed as an ingredient in a fat and oil, e.g., a peanut butter whose oil ingredient does not separate even though non-hydrogenated.

In other variations, the complexed fat can be saponified with an alkali such as sodium or potassium hydroxide to make a thickened vegetable oil soap. In still other variations, the complexed fats can be used as an ingredients in various emulsions whether water-in-oil ("w/o") or oil-in-water ("o/w") in both food and non-food applications.

Food products can advantageously be formulated using fat compositions as described herein, wherein cyclodextrin is complexed to the fat. Reduced amount of uncomplexed cyclodextrin in intimate contact with fat is particularly advantageous, as noted above, in reduction of the generation of undesirable cyclodextrin residues. It is specifically contemplated that food products can additionally comprise cyclodextrin that is not complexed to fat, and additionally is not in intimate contact with fat as a separate additive to the food product. For example, cyclodextrin that is not complexed to fat and not in intimate contact with fat can be added as a component of encapsulated flavorants, for sequestering of bile acids as taught in U.S. patent application Ser. No. 10/172,471, filed Jun. 14, 2002, titled "FOOD PRODUCT HAVING INCREASED BILE ACID BINDING CAPACITY," LEWANDOWSKI ET AL; for reduction of generation of acrylamides in food products as taught in U.S. patent application Ser. No. 10/630,489, filed Jun. 22, 2003, titled "TREATMENT COMPOSITION FOR REDUCING ACRYLAMIDE IN FOOD PRODUCTS AND FOOD INTERMEDIATES," PLANK ET AL; or for reduction of cholesterol as taught in U.S. patent application Ser. No. 10/318,445 Filed Dec. 13, 2002, titled "FOOD PRODUCTS CONTAINING CYCLODEXTRINS HAVING BENEFICIAL HYPOCHOLESTEROLEMIC EFFECTS AND METHOD OF MAKING AND COMMUNICATING THE BENEFIT OF SUCH PRODUCTS," PLANK ET AL.

In an embodiment of the present invention, the food product as described herein is provided and additionally, at least one indicium is prepared concerning the beneficial effect of the food product. The indicia are released to consumers, thereby informing the consumer of the surprising low trans-fat and optionally low saturated fat content of the food product. The indicia can optionally be provided in audio or visual media. The release of such indicia is usually tailored to certain pre-selected or predefined formats and can be done through traditional advertising routes that have at least an audio capability such as radio and television as well printed materials. Printed materials can include the packaging into which the product is placed as well as newspapers, letters, direct mail pieces, magazines and the like. This information empowers individuals to make choices regarding the food that they consume, thereby enabling an alteration of the behavior of individuals. Thus, the knowledge of the benefit of the food product of the present invention does not merely inform consumers that the food is good for them, but rather facilitates choice in the total diet to either select food products that will reduce trans-fat and/or saturated fat consumption by the consumer or to permit consumption of additional foods having higher trans-fat and/or saturated fat content than would otherwise be permitted to the consumer who is carefully monitoring trans-fat and/or saturated fat intake.

Test Protocol

Hardness can be measured by the force required to obtain a given deformation or by the amount of deformation under a given force. Spreadability is the ease with which a fat can be applied in a thin, even layer to a substrate, such as bread. Although spreadability is also a deformation under an external load, it is a more dynamic property. Measurements of hardness and spreadability are usually highly correlated. Some differences can be observed, however, as a function of the impact of worksoftening on the physical characteristics of the particular fat.

The parameters of hardness and spreadability can be applied to distinguish hardened fats like those produced from complexation with cyclodextrins. A fat or oil complexed with a cyclodextrin will show increases in either hardness, spreadability or both relative to the same fat or oil without added cyclodextrin.

A Model TA.XT Plus Texture Analyzer from Stable Micro Systems, Ltd. is used to measure both hardness and spreadability. The TTC Spreadability Fixture is a set of precisely matched male and female Perspex™ 90° cones. The material is allowed to set up in the lower cone or is filled into the lower cone with a spatula. The material is pressed down only so much as is needed to eliminate air pockets which are visible through the Perspex™ cones, and then the surface is leveled with a flat knife. Excessive work is not introduced into the product. The samples are allowed to equilibrate to the specified temperature (e.g. 23° C.) before testing.

All patents, patent documents, and publications cited herein are incorporated by reference as if individually incorporated. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A process of preparing a complexed fat composition in a continuous process comprising: the steps of:
   a) mixing a cyclodextrin with a solvent in an in-line mixing system at a temperature of from about 180 to about 200° F. (82.2 to about 93.3° C.), thereby solubilizing the cyclodextrin;
   b) mixing fat and the solubilized cyclodextrin in a static mixer mixing system at a temperature of from about 80 to about 120° F. (26.7 to about 48.9° C.) to form a fat/cyclodextrin composition comprising a fat/cyclodextrin complex; and
   c) cooling the fat/cyclodextrin composition in an in-line mixing system.

2. The method of claim 1, wherein the solvent comprises water.

3. The method of claim 1, wherein the cyclodextrin is alpha cyclodextrin.

4. The method of claim 1, wherein in the solubilization step, the cyclodextrin and solvent are mixed at weight ratios from about 2:1 to about 1:2 of cyclodextrin to solvent.

5. The method of claim 1, wherein the fat is selected from the group consisting of soybean oil, corn oil, rapeseed or canola oil, copra oil, cottonseed oil, fish oil, safflower oil, olive oil, sunflower oil, peanut oil, palm oil, palm kernel oil, coconut oil, rice bran oil, and mixtures thereof.

6. The method of claim 1, wherein the solubilized cyclodextrin is combined with the fat in an amount of from about 0.05% to about 15% by weight of the fat.

7. The method of claim 1, wherein the solubilized cyclodextrin is combined with the fat in an amount of from about 1% to about 10% by weight of the fat.

8. The method of claim 1, wherein the static mixer is an open lattice static mixer comprising from about 3 to about 12 mixer elements.

9. The method of claim 1, wherein the static mixer is an open lattice static mixer comprising from about 4 to 7 mixer elements.

10. The method of claim 1, wherein the static mixer has an inner diameter of from about 6 to about 14 mm diameter.

11. The method of claim 1, wherein the cooling step in carried out by a swept surface heat exchanger.

12. The method of claim 1, wherein the cooling step in carried out to a temperature of from about 60 to about 80° F. (15.5 to about 26.7° C.).

13. The method of claim 1, wherein at least about 25% of the cyclodextrin in the fat/cyclodextrin composition is complexed with the fat.

14. The method of claim 1, wherein at least about 50% of the cyclodextrin in the fat/cyclodextrin composition is complexed with the fat.

15. A process of preparing a complexed fat composition in a continuous process comprising: the steps of:
   a) mixing a cyclodextrin with a solvent in an in-line mixing system at a temperature of from about 180 to about 200° F. (82.2 to about 93.3° C.), thereby solubilizing the cyclodextrin;
   b) mixing fat and the solubilized cyclodextrin in a static mixer mixing system at a temperature of from about 80 to about 120° F. (26.7 to about 48.9° C.) and at a flow rate of from about 250 to about 350 cm/s at a pressure of about 500 psi to form a fat/cyclodextrin composition comprising a fat/cyclodextrin complex; and
   c) cooling the fat/cyclodextrin composition in an in-line mixing system.

* * * * *